(12) United States Patent
Hasemann et al.

(10) Patent No.: US 6,844,428 B2
(45) Date of Patent: Jan. 18, 2005

(54) USE OF DISAZO COMPOUNDS

(75) Inventors: Ludwig Hasemann, Müllheim (DE); Friedrich Lehr, Efringen-Kirchen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/433,447

(22) PCT Filed: Dec. 3, 2001

(86) PCT No.: PCT/IB01/02286
§ 371 (c)(1),
(2), (4) Date: Jun. 3, 2003

(87) PCT Pub. No.: WO02/46316
PCT Pub. Date: Jun. 13, 2002

(65) Prior Publication Data
US 2004/0111813 A1 Jun. 17, 2004

(30) Foreign Application Priority Data
Dec. 4, 2000 (GB) .............................. 0029468

(51) Int. Cl.⁷ ...................... C09B 62/09; C00B 35/029; D06P 1/382; D06P 1/39
(52) U.S. Cl. ..................... 534/637; 534/797; 8/527; 8/549; 8/681; 106/31.48
(58) Field of Search ................. 534/637, 797; 8/527, 549, 681; 106/31.48

(56) References Cited

U.S. PATENT DOCUMENTS 4,061,627 A * 12/1977 Conrow et al. ............. 534/689
4,410,652 A 10/1983 Robinson et al. .......... 524/195

FOREIGN PATENT DOCUMENTS

| DE | 31 37 404 | 5/1981 |
| DE | 197 35 769 | 2/1999 |
| EP | 0 896 032 | 2/1999 |
| FR | 1 572 030 | 6/1969 |
| GB | 1 202 798 | 8/1970 |
| JP | 48 000167 | 1/1973 |
| WO | 81/02423 | 9/1981 |
| WO | 99/21922 | 5/1999 |

OTHER PUBLICATIONS

Blus, Przeglad Wlokienniczy + Technik Wlokienniczy, 7, 22–24, 2000.*
Entglish Abstract for JP 48 000167, Jan. 6, 1973.
English Abstract for DE 31 37 404 A1, May 15, 1981.
English Abstract for EP 0 896 032, Feb. 10, 1999.
English Abstract for DE 197 35 769, Feb. 25, 1999.
"Synthesis and Properties of Acid Reds Derived from Symmetric 1,3,5–triazine", K. Blus, Przeglad Wlokienniczy + Technik Wlokienniczy (2000), 7, pp 22–24.
English Abstract for CE above.

* cited by examiner

Primary Examiner—Fiona T. Powers
(74) Attorney, Agent, or Firm—Anthony A. Bisulca

(57) ABSTRACT

The invention relates to the use of disazo compounds according to formula (I)

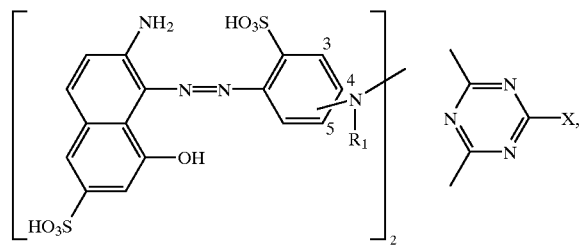

wherein all substituents are as defined in claim 1 salts thereof and mixtures of these compounds for dyeing or printing organic substrates, to novel compounds, to the process for the production of these compounds and to substrates dyed or printed by these compounds.

17 Claims, No Drawings

USE OF DISAZO COMPOUNDS

The invention relates to the use of disazo compounds, salts thereof and mixtures of these compounds for dyeing or printing organic substrates, to novel compounds, to the process for the production of these compounds and to substrates dyed or printed by these compounds.

According to the invention, a compound of formula (I)

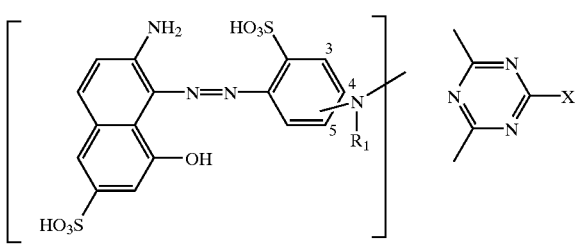

(I)

wherein
- $R_1$ is H; $C_{1-4}$alkyl or substituted $C_{1-4}$alkyl;
- X is halogen or —$NR_2R_3$ wherein,
  - $R_2$ is H; $C_{1-6}$alkyl; substituted $C_{1-6}$-alkyl or $C_{1-6}$alkyl, which is interrupted by one or more atoms from the group consisting of O, N and S;
  - $R_3$ is $C_{1-6}$alkyl; substituted $C_{1-6}$alkyl; $C_{1-6}$alkyl, which is interrupted by one or more atoms from the group consisting of O, N and S or phenyl which is substituted by one or more carboxy, sulfo, $C_{1-4}$alkyl and/or $C_{1-4}$alkoxy; or
  - $R_2$ and $R_3$ together with the nitrogen atom form a 5, 6 or 7 membered heterocyclic ring which optionally can contain more than one heteroatom from the group consisting of N, O and S and which may be additionally substituted by a $C_{1-2}$alkyl-OH group;

salts thereof and mixtures of these compounds are used for dyeing or printing organic substrates.

The alkyl groups may be linear or branched.

Preferred substituents for the alkyl groups are —OH, —COOH, —CN, halogen, —$COOC_{1-2}$alkyl, —$SO_3H$, —$CONH_2$, —$NH_2$, $C_{1-2}$alkoxy and/or $NO_2$.

Preferably compounds according to formula (I) wherein
- $R_1$ is H; $C_{1-2}$alkyl or substituted $C_{1-2}$alkyl;
- X is halogen, preferably Cl or —$NR_2R_3$ wherein,
  - $R_2$ is H; unsubstituted $C_{1-2}$alkyl; $C_{1-4}$-alkyl which is monosubstituted or disubstituted by —COOH, —$CONH_2$, —$SO_3H$ or —OH;
  - $R_3$ is unsubstituted $C_{1-2}$alkyl; $C_{1-4}$-alkyl which is monosubstituted or disubstituted by —COOH, —$CONH_2$, —$SO_3H$ or —OH or phenyl which is substituted by one or more carboxy, sulfo, $C_{1-4}$alkyl and/or $C_{1-4}$alkoxy; or
  - $R_2$ and $R_3$ together with the nitrogen atom form a 6 membered heterocyclic ring which optionally can contain more than one heteroatom from the group consisting of N, O and S and which may be additionally substituted by a $C_{1-2}$alkyl-OH group;

salts thereof and mixtures of these compounds are used for dyeing or printing organic substrates.

More preferably, compounds having the formula (Ia)

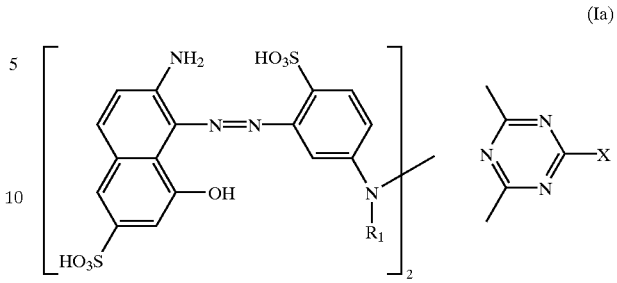

(Ia)

wherein $R_1$ and X have the same meanings as defined above as well as salts thereof and mixtures of these compounds are used for dyeing or printing organic substrates.

Further more preferably, compounds having the formula (Ib)

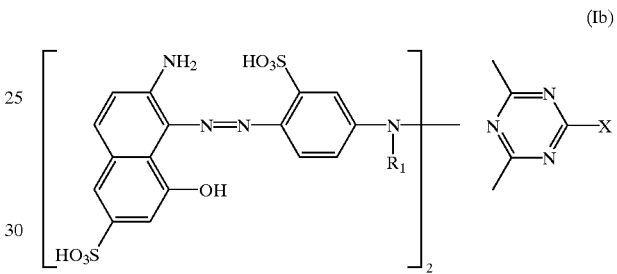

(Ib)

wherein $R_1$ and X have the same meanings as defined above as well as salts thereof and mixtures of these compounds are used for dyeing or printing organic substrates.

When a compound of formula (I), (Ia) or (Ib) is in salt form, the cation associated with sulpho, sulfato and any carboxy groups is not critical and may be any one of those non-chromophoric cations conventional in the field of direct dyes provided that the corresponding salts are water-soluble. Examples of such cations are alkali metal cations and unsubstituted and substituted ammonium cations, e.g., lithium, sodium, potassium, ammonium, mono-, di- and tri-ethanolammonium. The ammonium radicals can have the following formula $^+NR_4R_5R_6R_7$, wherein $R_4$, $R_5$, $R_6$ and $R_7$ are independently from each other H, $C_{1-4}$-alkyl and/or $C_{2-4}$-hydroxyalkyl. Preferred such ammonium radicals are $^+NH_3CH_2CH_2OH$, $^+NH_2(CH_2CH_2OH)_2$, $^+NH(CH_2CH_2OH)_3$, $^+N(CH_2CH_2OH)_4$, $^+NH(CH_3)(CH_2CH_2OH)_2$, $^+NH(CH_3)_2(CH_2CH_2OH)$, $^+N(CH_3)_4$ or $^+NH(C_2H_5)(CH_2CH_2OH)_2$. If a compound according to formula (I), (Ia) or (Ib) contains such ammonium cations the preferred amount of these cations in relation to the total amount of cations is more than 50 equivalent %, more preferred an amount of more than 60 equivalent %, especially preferred an amount of more than 75 equivalent %.

The present invention further provides novel compounds of formula (I), (Ia) and (Ib), wherein all substituents are defined as above, with the proviso that X is not —$NR_2R_3$, wherein $R_2$ and $R_3$ together with the nitrogen atom form a 6 membered heterocyclic ring, which contains more than one heteroatom from the group consisting of N, O or S, salts thereof and mixtures of these compounds.

The present invention further provides a process for the preparation of compounds of formula (I), (Ia) and/or (Ib) comprising reacting two mols of a compound of formula (II)

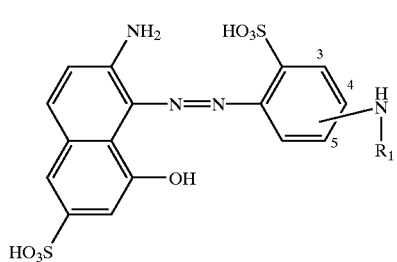

in which all substituents are as above defined with one mol of cyanuric halogenide so as to give a compound of formula (III)

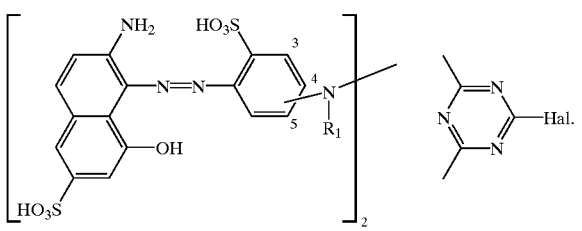

Finally, such a compound is further reacted with an appropriate amino compound to give a compound of formula (I), (Ia) or (Ib) in which X is an amino group.

The compounds of formula (I), (Ia) or (Ib) thus obtained may be isolated in accordance with known methods.

The type of cations assigned to the sulpho groups in a compound of formula (I), (Ia) or (Ib) may be influenced in various ways in accordance with the process; these are known methods throughout. In particular, mixed salts may be obtained by well-directed control of the process employed.

A preferred process for producing compounds according to formula (I), (Ia) or (Ib) wherein the cations comprise ammonium cations according to the above defined formula $^+NR_4R_5R_6R_7$ comprises the step of membrane-filtration of aqueous solutions or suspensions of compounds of formula (I), (Ia) or (Ib) in the presence of ammonium salts of formula $^+NR_4R_5R_6R_7An^-$ wherein $An^-$ signifies an inorganic anion. The membrane filtration process can comprise concentration or diafiltration.

The compounds according to the invention in the form of their water-soluble salts are used for dyeing or printing organic substrates containing hydroxy groups, thiol groups or nitrogen, in particular as paper dyes or direct dyes.

As a result of their high substantivity, the compounds according to the invention are very suitable as direct dyes. The usual technical application processes are employed as dyeing and printing processes. Natural and regenerated cellulose, e.g. cotton, are preferably dyed by a conventional exhaust process at dyeing temperatures of 50–100° C.

The dyestuffs according to the invention are notable for their depth of color, and produce good exhaust. The dyeings obtained (especially on cotton and paper) are of pure shade.

On the said substrates, the dyeings generally have very good wet fastnesses and excellent light fastness. The very good water and perspiration fastness and good fastness to peroxide, perborate and chlorine may also be mentioned.

The wet fastness of the direct dyeings on cellulosic textile materials may be decisively improved by means of a special after-treatment with selected assistants. In particular, the washing fastness is improved such that its quality level does not undergo any reduction even after repeated washes at 60° C.

A suitable assistant for this after-treatment may be a fixing agent in the form of a precondensate or mixture, which is obtained either A) from the product of reacting the mono- or polyfunctional primary or secondary amine with cyanamide, dicyandiamide, guanidine or biguanide; or of ammonia with cyanamide or dicyandiamide, whereby the product contains reactive hydrogen atoms bonded to nitrogen, or B) from a quaternary polyalkylene-polyamine with C) a N-methylol compound of a urea, melamine, guanamine, triazinone, urone, carbamate or acid diamide, optionally in the presence of D) a catalyst for cross-linking with a N-methylol compound of type C.

Details relating to the assistant in the form of the combination A/C/D are described in detail in PCT application publication no. WO 81/02 423; details on the combination B/C/D may be found in German Published Specification DOS 31 37 404.

Printing is effected by means of impregnation with a printing paste which is prepared by a known method.

The new dyestuffs may also be used for dyeing or printing leather, preferably chrome-tanned types of leather, using methods known per se. In addition, the dyestuffs may be used to produce inks for by a method known per se.

Most preferably, the dyestuffs are used for dyeing or printing of paper e.g., sized or unsized, wood-free or wood-containing paper or paper-based products such as cardboard. They may be used in continuous dyeing in the stock, dyeing in the size press, in a conventional dipping or surface coloring process. The dyeing and printing of paper is effected by known methods.

The dyeings and prints and particularly those obtained on paper, show good fastness properties.

The compounds of formula (I), (Ia) and (Ib) may be converted into dyeing preparations. Processing into stable liquid, preferably aqueous, or solid (granulated or powder form) dyeing preparations may take place in a generally known manner. Advantageously suitable liquid dyeing preparations may be made by dissolving the dyestuff in suitable solvents such as mineral acids or organic acids, e.g., hydrochloric acid, sulphuric acid, phosphoric acid, formic acid, acetic acid, lactic acid, glycolic acid, citric acid and methanesulphonic acid. Furthermore formamide, dimethylformamide, urea, glycols and ethers thereof, dextrin or addition products of boric acid with sorbite may be used together with water, optionally adding an assistant, e.g. a stabilizer. Such preparations may be obtained, for example, as described in French patent specification No. 1,572,030.

The use of ultrafiltration or membranefiltration is advantageous.

The compounds of formula (I), (Ia) and (Ib) (in the corresponding salt form) have good solubility especially in cold water. Owing to their high substantivity the compounds of the present invention exhaust practically quantitatively and show a good build-up power. They can be added to the stock directly, i.e. without previously dissolving, as either a dry powder or granulate, without reducing the brilliance or the yield of color. They can also be used in soft water without loss of yield. They do not mottle when applied on paper, are not inclined to give two-sided dyeing on paper and are practically insensitive to filler or pH variations. They operate over a broad pH range, in the range of from pH 3 to 10. When producing sized or unsized paper, the wastewater is essentially colorless. This feature, which is extremely important from an environmental viewpoint, when compared with similar known dyes, shows a marked improvement. A sized paper dyeing when compared with the corresponding unsized paper dyeing does not show any decrease in strength.

The paper dyeings or printings made with the compounds according to the invention are clear and brilliant and have excellent light fastness. They show very good wet fastness properties; being fast to water, milk, fruit juice, sweetened mineral water, tonic water, soap and sodium chloride solution, urine etc. Furthermore, they have good alcohol fastness properties. The wet fastness properties are improved compared to known dyes showing otherwise similar properties. They do not exhibit a tendency towards two-sidedness.

Paper dyed or printed with the compounds of the present invention can be bleached either oxidatively or reductively, a feature which is important for the recycling of waste and old paper/paper products. It has surprisingly been found that the dyes of the present invention demonstrate excellent bleachability, particularly when bleaching is carried out reductively. This property, together with the improved backwater results and wet-fastnesses, shows a marked improvement over known dyes having otherwise similar properties.

The compounds of the present invention may also be used to dye paper containing wood-pulp where even dyeings, having good fastness properties are obtained. Furthermore, they may be used for the production of coated paper in accordance with known methods. Preferably when coating, a suitable filler, for example kaolin, is employed in order to give a one-side coated paper.

The compounds of the present invention are also suitable for dyeing in combination with other dyes for example other cationic or anionic dyes. The compatibility of the compounds of the present invention when used as a dye in mixtures with other commercially available dyes, may be determined according to conventional methods. The thus obtained dyeings have good fastness properties.

The invention further provides a substrate which has been dyed or printed with a compound of the present invention. The substrate may be selected from any of the above mentioned substrates. A preferred substrate is a substrate comprising cellulose such as cotton or paper or paper based product.

The invention further provides a preferred process of dyeing paper comprising the continuous introduction into a stock solution which is being constantly agitated, of a dye of the present invention.

The invention yet further provides the use of a compound of the present invention for dyeing or printing any of the abovementioned substrates.

The following Examples further serve to illustrate the invention. In the Examples all parts and all percentages are by weight and the temperatures given are in degrees Celsius, unless indicated to the contrary. Parts of weight relate to parts by volume as g to ml.

EXAMPLE 1a

In a reaction vessel of 4.5 liters, equipped with stirrer, reflux cooler, pH-electrode and thermometer, a mixture of 84 g water, 84 g ice and 15.1 g of 2,4,6-trichloro-1,3,5-triazine with 3 drops of a wetting agent (e.g. Sandozin® NIN, Trademark of Clariant Ltd) is stirred for about 30 minutes at 0–5° C. to obtain a fine suspension. A solution of 203.2 g of 7-amino-1-hydroxy-8-(2'-sulfo, 4'-aminophenylazo)naphthalene-3-sulfonic acid (Titer ca. 35.4%) in 2000 ml water is added during a period of 1 hour while the pH value is adjusted to pH=4.8 by addition of a 15% solution of sodium carbonate. The solution is stirred 1 hour at pH 4.8 and at a temperature of 5–10° C. Afterwards the temperature is increased to 40° C. and the pH value up to 7.3 where the solution is stirred for 4 hours. Finally the temperature is increased to 60° C. and the solution is stirred for additional 3 hours. A dyestuff of the following (IV) formula is obtained

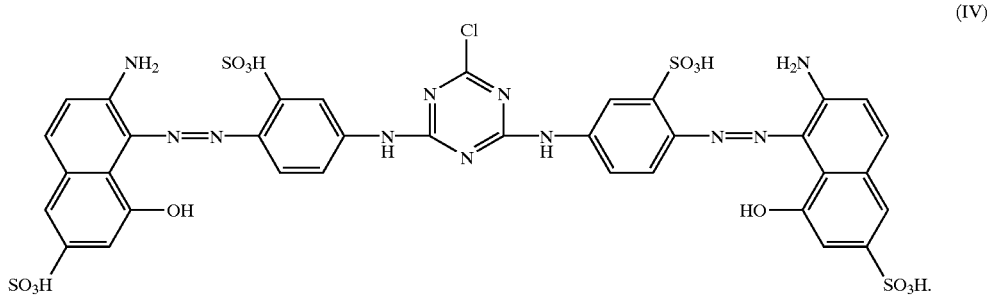

which dyes paper in bluish red hues ($\lambda_{max}$=521 in water/ammonium acetate).

EXAMPLE 1b

The procedure of Example 1a is repeated. But instead of isolating the dyestuff of formula (IV) 11.2 g diethanolamine are added and the mixture is heated to 97° C. The pH-value first raises to about 9.2 and drops during the reaction. It is kept at 8.5 by addition of a 30% solution of sodium hydroxide. After about 8 hours the reaction is completed. The reaction mixture is then cooled to 80° C. and 300 g NaCl is added in portions. After stirring over night and cooling to room temperature the precipitated dyestuff is filtered and dried in vacuum at 80° C. 106 g of dyestuff with the structure of formula (V)

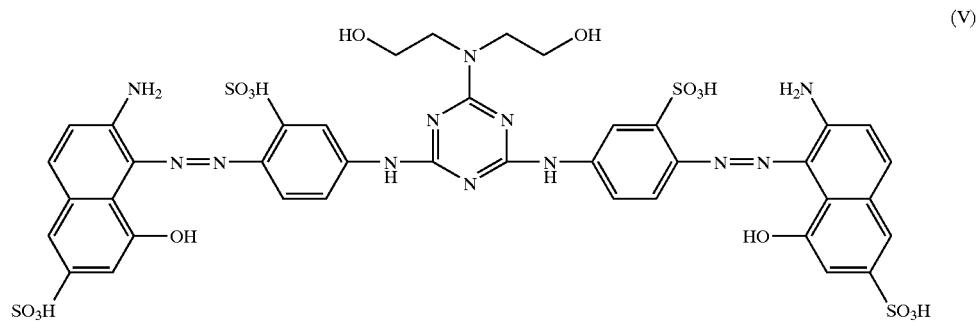

(V)

are obtained in the form of the sodium salt. It dyes sized and unsized paper in bluish red hues ($\lambda_{max}$=520 nm, in water/ammonium acetate).

EXAMPLE 1c

A solution of 280.6 parts 7-amino-1-hydroxy-8-(2'-sulfo, 4'-amino-phenylazo)naphthalene-3-sulfonic acid in 8.5 liter water is dimerized with 59.0 parts of 2,4,6-trichloro-1,3,5-triazine as described in Example 1a and treated with 52.6 g diethanolamine analogously as described in Example 1b. The reaction mixture of 95° C. is cooled to 50° C. and 40 parts of Hyflo-Supercel (filtration auxiliary) are added. After stirring to 10 minutes at 50° C., the reaction mixture is filtrated. The ca. 9500 parts process solution are ultrafiltrated at 30–40° C. by using a G50 membrane and concentrated up to 3382 parts solution. The obtained liquid dyestuff formulation contains only traces of remaining inorganic salts and exhibits perfect storage stability.

EXAMPLE 1d

Example 1c is repeated. The 9500 parts process solution are ultrafiltrated at 30–40° C. by using a G50 membrane in the presence of 710 parts triethanolamine hydrochloride as diafiltration additive and concentrated up to 3382 parts solution. The obtained liquid dyestuff formulation contains only traces of remaining inorganic salts and exhibits perfect storage stability.

TABLE 1

Examples 2–30
Further dyestuffs of the general formula (Ic) may be produced analogously to the procedure given in Examples 1b, 1c and 1d.

(Ic)

Structure: A symmetric bis-azo dye with a central triazine bearing substituent X, connected via NH linkages to two sulfonated phenyl-azo-aminonaphthol-sulfonic acid moieties.

| Ex. | X | λmax* (nm) |
|---|---|---|
| 2 | —NH—CH₂CH₂—OH | 546 |
| 3 | —N(morpholino) | 521 |
| 4 | —NH—CH₂CH₂—SO₃H | 521 |
| 5 | —N(CH₃)—CH₂CH₂—SO₃H | 546 |
| 6 | —NH—CH₂CH₂—COOH | 546 |
| 7 | —NH—CH₂—COOH | 529 |
| 8 | —N(CH₃)—CH₂—COOH | 517 |
| 9 | —NH—(2,4-disulfophenyl) | 540 |
| 10 | —NH—CH₂CH₂CH₂—OH | 520 |
| 11 | —NH—CH₂—CH(OH)—CH₃ | 522 |
| 12 | —NH—CH(CH₂OH)₂ | 519 |
| 13 | —NH—C(CH₂OH)₃ | 539 |

TABLE 1-continued

Examples 2–30
Further dyestuffs of the general formula (Ic) may be produced analogously to the procedure given in Examples 1b, 1c and 1d.

(Ic)

| Ex. | X | λmax* (nm) |
|---|---|---|
| 14 | —NH—CH₂CH₂—O—CH₂CH₂—OH | 518 |
| 15 | —N(CH₃)—CH₂CH₂—OH | 520 |
| 16 | —N(piperazinyl)—CH₂CH₂—OH | 521 |
| 17 | —NH—C₆H₄—SO₃H (para) | 541 |
| 18 | —NH—C₆H₄—SO₃H (meta) | 542 |
| 19 | —NH—C₆H₄—SO₃H (ortho) | 539 |
| 20 | —NH—C₆H₃(CH₃)(SO₃H) | 540 |
| 21 | —NH—C₆H₄—OCH₃ | 541 |
| 22 | —NH—C₆H₄—COOH (para) | 538 |
| 23 | —NH—C₆H₄—COOH (meta) | 539 |

TABLE 1-continued

Examples 2–30
Further dyestuffs of the general formula (Ic) may be produced analogously to the procedure given in Examples 1b, 1c and 1d.

(Ic)

| Ex. | X | λmax* (nm) |
|---|---|---|
| 24 | —NH—C₆H₄(COOH) (2-carboxyphenylamino) | 537 |
| 25 | —NH—C₆H₃(COOH)₂ (3,5-dicarboxyphenylamino) | 539 |
| 26 | —NH—C₆H₃(OCH₃)(COOH) | 542 |
| 27 | —NH—CH(COOH)(CH₂COOH) | 522 |
| 28 | —NH—CH(COOH)(CH₂CONH₂) | 522 |
| 29 | —NH—CH(COOH)(C₂H₄COOH) | 520 |
| 30 | —NH—CH(COOH)(C₂H₄CONH₂) | 519 |

*solvent: Water/ammonium acetate

TABLE 2
Examples 31–56
Further dyestuffs of the general formula (Id) may be produced analogously to the procedure given in Examples 1b, 1c and 1d. Example 31 is prepared according to Example 1a.
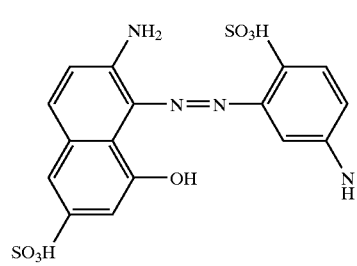
(Id)
| Ex. | X | λmax* (nm) |
|---|---|---|
| 31 | Cl | 522 |
| 32 | 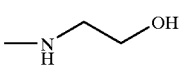 | 518 |
| 33 | 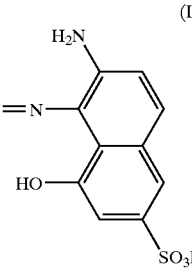 | 520 |
| 34 | 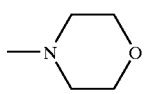 | 519 |
| 35 | 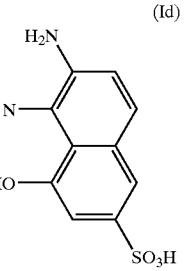 | 518 |
| 36 | 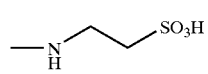 | 517 |
| 37 | 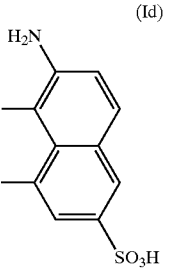 | 519 |
| 38 | 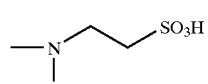 | 520 |
| 39 | 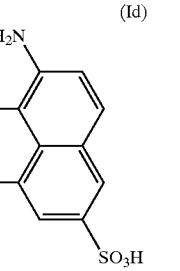 | 522 |
| 40 | 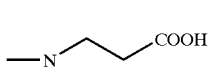 | 521 |
| 41 | 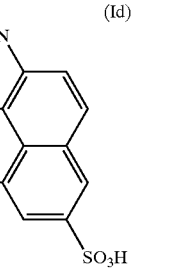 | 520 |
| 42 | 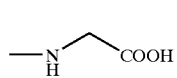 | 518 |

TABLE 2-continued

Examples 31–56
Further dyestuffs of the general formula (Id) may be produced analogously to the procedure given in Examples 1b, 1c and 1d. Example 31 is prepared according to Example 1a.

(Id)

| Ex. | X | λmax* (nm) |
|-----|---|-----------|
| 43 | —NH—C(CH2OH)3 | 519 |
| 44 | —NH—CH2CH2—O—CH2CH2—OH | 519 |
| 45 | —N(CH3)—CH2CH2—OH | 520 |
| 46 | —N(piperazine)N—CH2CH2—OH | 522 |
| 47 | —NH—C6H4—SO3H (para) | 524 |
| 48 | —NH—C6H4—SO3H (meta) | 523 |
| 49 | —NH—C6H4—SO3H (ortho) | 525 |
| 50 | —NH—C6H3(CH3)(SO3H) | 524 |
| 51 | —NH—C6H4—OCH3 | 523 |
| 52 | —NH—C6H4—COOH | 524 |

TABLE 2-continued

Examples 31–56
Further dyestuffs of the general formula (Id) may be produced analogously to the procedure given in Examples 1b, 1c and 1d. Example 31 is prepared according to Example 1a.

(Id)

Structure: naphthalene ring (with NH$_2$, OH, SO$_3$H substituents)—N=N—phenyl(SO$_3$H)—NH—triazine(X)—NH—phenyl(SO$_3$H)—N=N—naphthalene ring (with H$_2$N, HO, SO$_3$H substituents)

| Ex. | X | λmax* (nm) |
|---|---|---|
| 53 | —NH—C$_6$H$_4$—COOH (3-carboxyphenylamino) | 526 |
| 54 | —NH—C$_6$H$_4$—COOH (2-carboxyphenylamino) | 523 |
| 55 | —NH—C$_6$H$_3$(COOH)$_2$ (3,5-dicarboxyphenylamino) | 524 |
| 56 | —NH—C$_6$H$_3$(OCH$_3$)(COOH) (4-methoxy-3-carboxyphenylamino) | 526 |

*solvent: Water/ammonium acetate

APPLICATION EXAMPLE A 70 parts of chemically bleached sulphite cellulose of pinewood and 30 parts of chemically bleached sulphite cellulose of birchwood are ground in a Hollander in 2000 parts of water. 0.5 parts of the dyestuff of example 1c are added into this pulp. After mixing for 20 minutes, paper is produced therefrom. The absorbent paper obtained in this way is dyed bluish-red. The waste water is practically colorless.

APPLICATION EXAMPLE B 0.2 parts of the dyestuff powder of example 1b are dissolved in 100 parts of hot water and cooled to room temperature. The solution is added to 100 parts of chemically bleached sulphite cellulose, which have been ground in a Holländer with 2000 parts of water. After thorough mixing for 15 minutes, sizing takes place in the usual way with rosin size and aluminium sulphate. Paper which is produced from this material has a bluish-red shade, and has good waste-water and wet fastness, as well as good light fastness.

APPLICATION EXAMPLE C

An absorbent length of unsized paper is drawn through a dyestuff solution of the following composition at 40–50° C.:
 0.5 parts of the dyestuff of example 1c
 0.5 parts of starch and
 99.0 parts of water.
The excess dyestuff solution is squeezed out through two rollers. The dried length of paper is dyed bluish-red.

Dyeing may also take place in a similar manner to that of examples A to C using the dyestuffs of examples 1a, 1b, 1c, 1d and 2 to 56 or mixtures thereof as well as dye preparations thereof. The paper dyeings obtained are bluish-red and have a high level of fastness.

APPLICATION EXAMPLE D 50 parts of bleached pinewood sulphite cellulose and 50 parts of bleached beech cellulose (degree of beating 30 SR*) are mixed with 0.5 parts of the dyestuff of example 1b in water (pH 4, water hardness 10 dH). After 16 minutes, sheet formation takes place. The paper is dyed in an intense bluish-red shade. In contrast, a dyeing made at pH 7 shows no variation in depth or shade. The rate of exhaustion reaches 100% and the waste water is colorless.

*) SR=Schopper Riegler degree

APPLICATION EXAMPLE E 100 parts of intermediate-dried chrome velours leather are drummed for one hour at 50° C. in a drum containing a bath of 400 parts of water, 2 parts of 25% ammonium hydroxide solution and 0.1 parts of a commercial wetting agent. The bath is subsequently drained. 400 parts of water of 60° C. and 1 part of 25% ammonium hydroxide solution are added to the drummed chrome velours leather which is still moist. After adding 5 parts of the dyestuff of example 1c, dissolved in 200 parts of water, dyeing is effected for 90 minutes at 60° C. Then, 50 parts of 8% formic acid are slowly added in order to acidify the pH. The treatment is then continued for a further 30 minutes. Finally, the leather is rinsed, dried and finished in the usual way. The bluish-red leather dyeing obtained is level.

APPLICATION EXAMPLE F 1.1 parts of the dyestuff of example 1c are dissolved at 60° C. in 100 parts of demineralized water and subsequently diluted with 900 parts of cold, demineralized water. Then, 100 parts of cotton tricot (bleached) are added to the dye bath. After 5 minutes, 10 parts of calcined sodium sulphate and 2 parts of ammonium sulphate are added. During 70 minutes, the temperature of the dye bath is continuously raised to 98° C. This temperature is maintained for 20 minutes and the dye bath is then cooled to 70° C. over the course of 30 minutes. The dyed material is rinsed for 2 minutes firstly with cold, demineralized water, and subsequently for 2 minutes with cold tap water, then centrifuged and dried. The cotton dyeing obtained is bluish-red.

APPLICATION EXAMPLE G 100 parts of cotton tricot, which have been dyed with the dyestuff of example 1c analogously to the method of example F in ca. 1/1 standard depth, are mixed without intermediate drying in 1000 parts of tap water at 25° C. with 5 parts of sodium chloride and 4 parts of an after-treatment agent obtained from the reaction of diethylenetri-amine with dicyandiamide. The pH value of the dye bath is set at 6.5–7. The bath is heated to 60° C. over the course of 20 minutes, and this temperature is maintained for a further 20 minutes. Afterwards, the material is rinsed with cold tap water. The bluish-red cotton dyeing which has been after-treated in this way has perfect washing fast-ness and very good light fastness.

APPLICATION EXAMPLE H

A cotton dyeing produced with the dyestuff of example 1c analogously to the method of example F in 1/1 standard depth, is impregnated on a padder with a solution, which contains 100 g/l of an after-treatment agent obtained by reacting the after-treatment agent of example G with dim-ethyloldihydroxyethyleneurea and a hardening catalyst, and it is squeezed out to a pick-up of ca. 80%. It is subsequently shock-dried for 45 seconds on a stenter at a temperature of 175–180° C. The bluish-red cotton dyeing thus obtained is notable for its perfect washing fastness. At the same time, there is a considerable improvement in the creasing fastness, and reduced swelling value of the cellulosic fibers.

APPLICATION EXAMPLE I

A printing paste having the components

| | |
|---|---|
| 40 | parts of the dyestuff of example 1c |
| 100 | parts of urea |
| 330 | parts of water |
| 500 | parts of a 4% sodium alginate thickener |
| 10 | parts of the sodium salt of 1-nitrobenzene-3-sulphonic acid |
| 20 | parts of soda |
| 1000 | parts in all | is applied to cotton material by conventional printing processes. The printed and dried material is steamed for 4–8 minutes at 102–105° C. and then given a cold and a hot rinse. The fixed cotton material is subsequently washed at the boil.

APPLICATION EXAMPLE J 12.6 parts dyestuff solution of example 1c are added dropwise at room temperature to a stirred mixture of 20.0 parts diethyleneglycole and 67.4 parts of demineralized water. The resulting ink exhibits good light- and waterfastness properties.

Dyeing may also take place in a similar manner to that of examples D to J using the dyestuffs of examples 1a, 1b, 1c, 1d and 2 to 56 or mixtures thereof as well as dye preparations thereof.

What is claimed is:

1. A method for dyeing or printing organic substrates comprising the steps of:

providing a compound of formula (I)

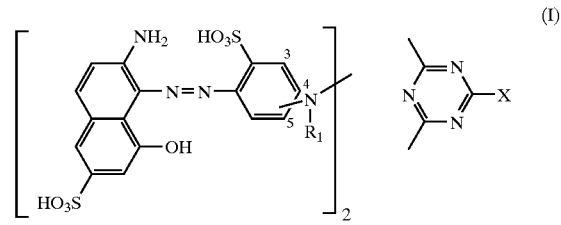

wherein
R$_1$ is H; C$_{1-4}$alkyl or substituted C$_{1-4}$alkyl;
X is halogen or —NR$_2$R$_3$ wherein,
R$_2$ is H; C$_{1-6}$alkyl; substituted C$_{1-6}$alkyl or C$_{1-6}$alkyl interrupted by one or more atoms selected from the group consisting of O, N and S;
R$_3$ is C$_{1-6}$alkyl; substituted C$_{1-6}$alkyl; C$_{1-6}$alkyl interrupted by one or more atoms selected from the group consisting of O, N and S or phenyl substituted by one or more carboxy, sulfo, C$_{1-4}$alkyl or C$_{1-4}$alkoxy; or
R$_2$ and R$_3$ together with the nitrogen atom form a 5, 6, or 7 membered hetero-cyclic ring which optionally can contain more than one heteroatom from the group consisting of N, O and S and which may be additionally substituted by a $C_{1-2}$alkyl-OH group;

salts thereof and mixtures of these compounds; providing an organic substrate; and contacting said compound of formula (I) with said organic substrate.

2. The method for dyeing or printing organic substrates according to claim 1 wherein:

$R_1$ is H; $C_{1-2}$alkyl or substituted $C_{1-2}$alkyl;

X is halogen or —$NR_2R_3$ wherein, $R_2$ is H; unsubstituted $C_{1-2}$alkyl; $C_{1-4}$alkyl which is monosubstituted or disubstituted by —COOH, —$CONH_2$, —$SO_3H$ or —OH;

$R_3$ is unsubstituted $C_{1-2}$alkyl; $C_{1-4}$-alkyl which is mono-substituted or disubstituted by —COOH, —$CONH_2$, —$SO_3H$ or —OH or phenyl which is substituted by one or more carboxy, sulfo, $C_{1-4}$alkyl and/or $C_{1-4}$alkoxy; or $R_2$ and $R_3$ together with the nitrogen atom form a 6 membered heterocyclic ring which optionally can contain more than one heteroatom from the group consisting of N, O and S and which may be additionally substituted by a $C_{1-2}$alkyl-OH.

3. The method for dyeing or printing organic substrates according to claim 1 where said compound of formula (I) has a formula (Ia)

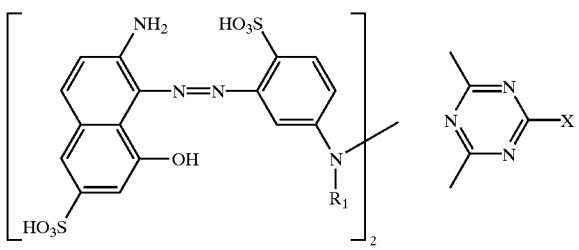

(Ia)

wherein X and $R_1$ have the meanings as defined in claim 1.

4. The method for dyeing or printing organic substrates according to claim 1 where said compound of formula (I) has a formula (Ib)

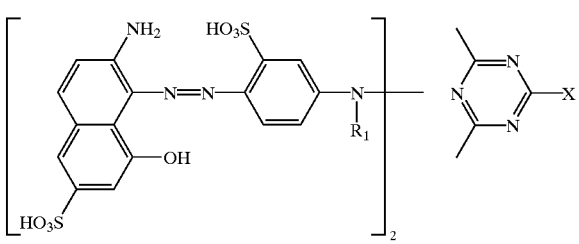

(Ib)

wherein X and $R_1$ have the meanings as defined in claim 1.

5. The method for dyeing or printing organic substrates according to claim 1 wherein the compounds of formula (I) or mixtures thereof are in their salt form, in which at least 50 equivalent % of all cations consists of ammonium cations of formula $^+NR_4R_5R_6R_7$, wherein $R_4$, $R_5$, $R_6$ and $R_7$ are independently from each other H, $C_{1-4}$-alkyl or $C_{2-4}$-hydroxyalkyl.

6. The method for dyeing or printing organic substrates according to claim 1 where said organic substrate is paper, a paper containing substrate, cellulose or a cellulose containing substrate.

7. Compounds of formula (I)

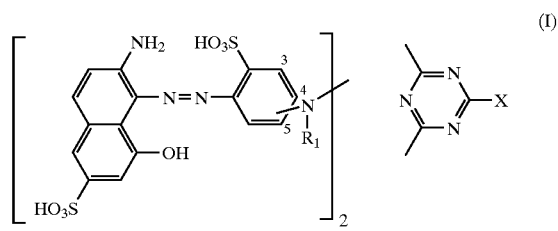

(I)

wherein $R_1$ is H; $C_{1-4}$alkyl or substituted $C_{1-4}$alkyl;

X is —$NR_2R_3$ wherein, $R_2$ is H; $C_{1-6}$-alkyl; substituted $C_{1-6}$alkyl or $C_{1-6}$alkyl interrupted by one or more atoms selected from the group consisting of O, N and S;

$R_3$ is $C_{1-6}$alkyl; substituted $C_{1-6}$alkyl; $C_{1-6}$alkyl interrupted by one or more atoms selected from the group consisting of O, N and S or phenyl substituted by one or more carboxy, sulfo, $C_{1-4}$alkyl or $C_{1-4}$alkoxy; or $R_2$ and $R_3$ together with the nitrogen atom form a 5, 6 or 7 membered hetero-cyclic ring which optionally can contain more than one heteroatom from the group consisting of N, O, S, and salts thereof and which may be additionally substituted by a $C_{1-2}$alkyl-OH group;

with the proviso that X is not —$NR_2R_3$, wherein $R_2$ and $R_3$ together with the nitrogen atom form a 6 membered heterocyclic ring, which contains more than one heteroatom selected from the group consisting of N, O, S, salts thereof and mixtures of these compounds.

8. A process for the preparation of a compound according to claim 7 comprising the step of: reacting two moles of a compound of formula (II)

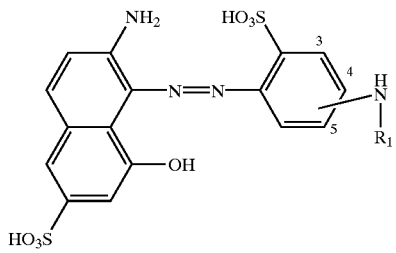

(II)

in which all substituents are as defined in claim 7 with one mol of cyanuric halo-genide and when X is different from halogen, the obtained compound is further reacted with an appropriate amino compound.

9. A process for the preparation of a liquid formulation comprising a compound of formula (I) according to claim 7 or mixtures thereof comprising the step of: membrane-filtration of aqueous solutions or suspensions of compounds of formula (I).

10. A process for the preparation according to claim 9 in which at least 50 equivalent % of all cations consists of ammonium cations of formula $^+NR_4R_5R_6R_7$, wherein $R_4$, $R_5$, $R_6$ and $R_7$ are independently from each other H, $C_{1-4}$-alkyl or $C_{2-4}$-hydroxyalkyl, wherein the step of membrane-filtration of aqueous solutions or suspensions of compounds of formula (I) is done in the presence of ammonium salts of formula $^+NR_4R_5R_6R_7An^-$ wherein $An^-$ signifies an inorganic anion.

11. An organic substrate dyed or printed according to claim 1.

12. Process for the preparation of an ink-jet ink, compromising the step of adding to the ink-jet ink a dye, wherein the dye is a compound of formula (I) according to claim 7 or mixtures thereof.

13. An ink-jet ink comprising a compound of formula (I) according to claim 7.

14. The method for dyeing or printing organic substrates according to claim 1 wherein:

X is Cl.

15. Compounds of formula (I) according to a claim 7 where formula (I) is formula (Ia)

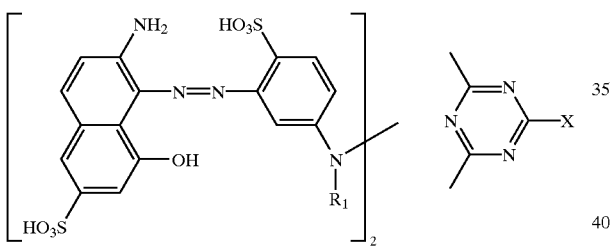

(Ia)

wherein X and $R_1$ have the meanings as defined in claim 7.

16. Compounds of formula (I) according to claim 7 where formula (I) is formula (Ib)

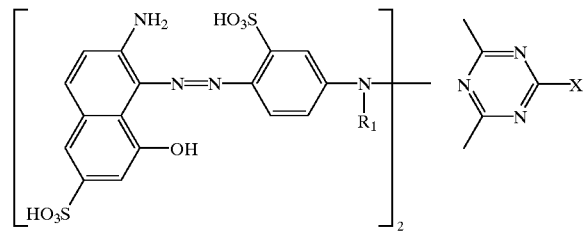

(Ib)

wherein X and $R_1$ have the meanings as defined in claim 7.

17. Compounds of formula (I)

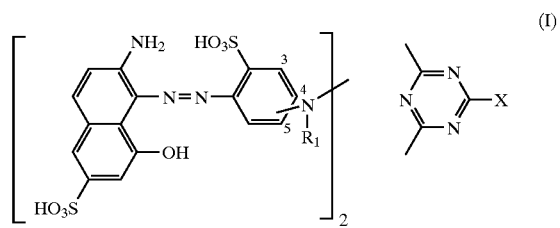

(I)

wherein
$R_1$ is $C_{1-4}$alkyl or substituted $C_{1-4}$alkyl;
X is halogen or —$NR_2R_3$ wherein,
$R_2$ is H; $C_{1-6}$alkyl; substituted $C_{1-6}$alkyl or $C_{1-6}$alkyl, which is interrupted by one or more atoms from the group consisting of O, N and S;
$R_3$ is $C_{1-6}$alkyl; substituted $C_{1-6}$alkyl; $C_{1-6}$alkyl, which is interrupted by one or more atoms from the group consisting of O, N and S or phenyl which is substituted by one or more carboxy, sulfo, $C_{1-4}$alkyl and/or $C_{1-4}$alkoxy; or $R_2$ and $R_3$ together with the nitrogen atom form a 5, 6 or 7 membered hetero-cyclic ring which optionally can contain more than one heteroatom from the group consisting of N, O, S and salts thereof and which may be additionally substituted by a $C_{1-2}$alkyl-OH group; with the proviso that X is not —$NR_2R_3$, wherein $R_2$ and $R_3$ together with the nitrogen atom form a 6 membered heterocyclic ring, which contains more than one heteroatom choosing from the group consisting of N, O or S, salts thereof and mixtures of these compounds.

* * * * *